US005687445A

United States Patent [19]

Hocking

[11] Patent Number: 5,687,445
[45] Date of Patent: Nov. 18, 1997

[54] LENS WIPE

[75] Inventor: Gretchen Ruth Hocking, Livonia, Mich.

[73] Assignee: Gretchen R. Hocking, Livonia, Mich.

[21] Appl. No.: 683,977

[22] Filed: Jul. 22, 1996

[51] Int. Cl.$^6$ ............................ G02C 13/00; A47L 13/17
[52] U.S. Cl. .................... 15/104.93; 15/209.1; 15/214
[58] Field of Search ............................ 15/104.93, 208, 15/209.1, 210.1, 214, 235

[56] References Cited

U.S. PATENT DOCUMENTS

| | | | |
|---|---|---|---|
| 2,754,532 | 7/1956 | Kanehl et al. | 15/209.1 |
| 4,673,523 | 6/1987 | Smith et al. | 15/104.93 |
| 5,000,204 | 3/1991 | Smith | 15/104.93 X |
| 5,286,019 | 2/1994 | Watabe | 15/210.1 X |
| 5,344,002 | 9/1994 | Baczkowski | 15/214 X |
| 5,444,890 | 8/1995 | Higginson | 15/214 |

Primary Examiner—Mark Spisich

[57] ABSTRACT

A device for the removal of wetness from eyewear while simultaneously applying an anti-fogging agent. A treated piece of soft, durable material such as chamois or other like material is cut to a usable size shape, although not necessarily the same size and shape. Attached to the material by stitching is a piping. Obviously other securing devices may be used. The piping has an elongated end that extends past the edge of the material enabling the user to create a loop by folding the elongated end of piping back to the point where it extends past material and securing the loop in place pressing together fastening two fastening devices in which one fastening device is outwardly extending hooked filaments that engage a pile surface on the other fastening device. Of course other devices for securing the loop may be substituted for the fastening devices described. The loop enables the user to conveniently carry the device by attaching it to one's clothing or equipment.

1 Claim, 5 Drawing Sheets

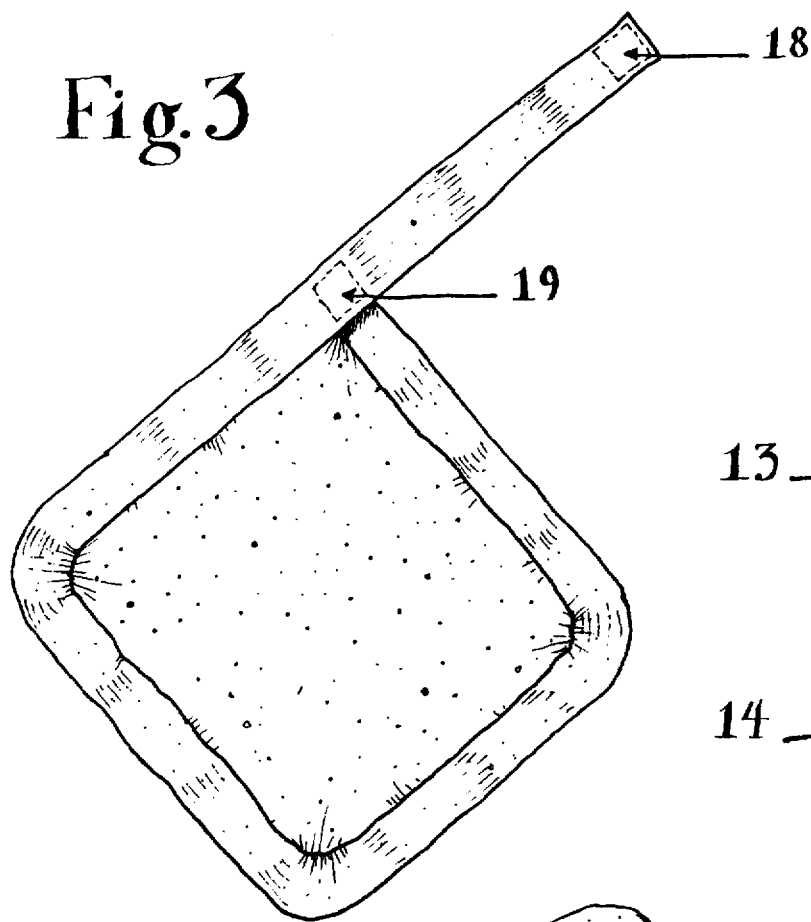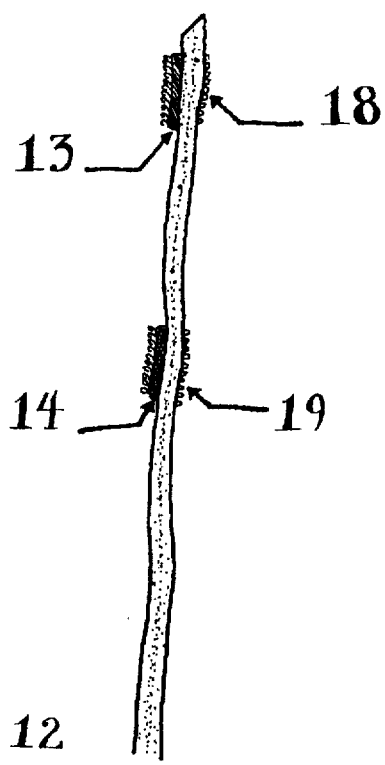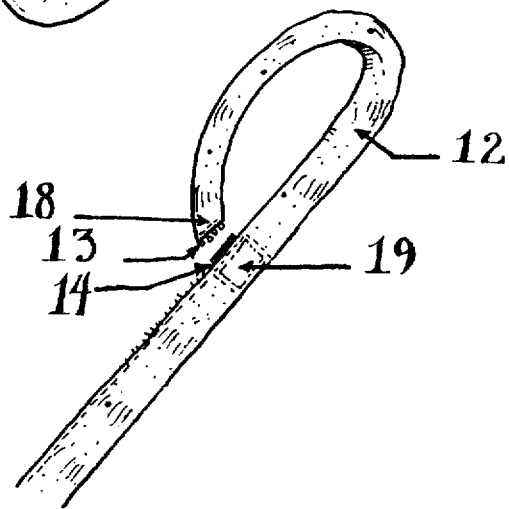

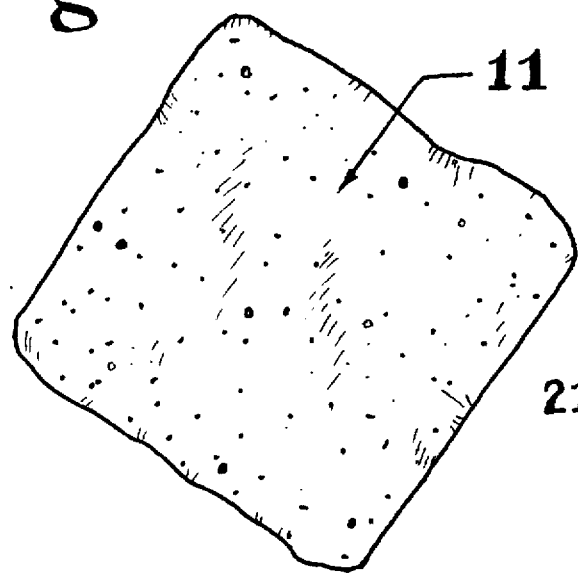
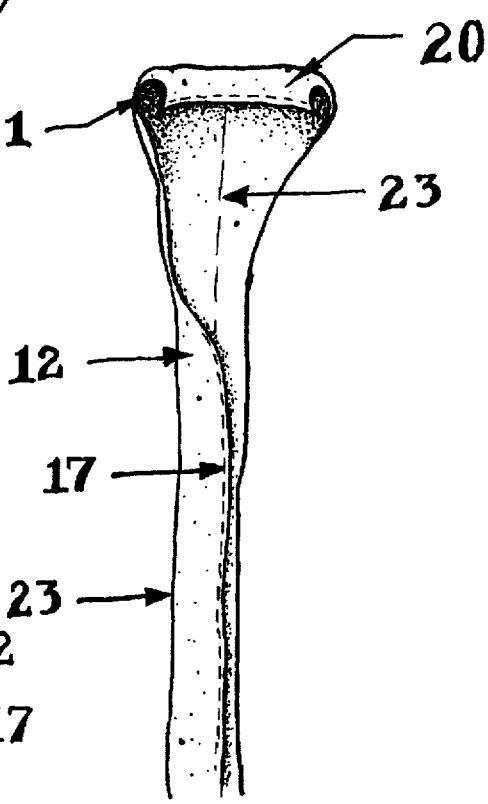
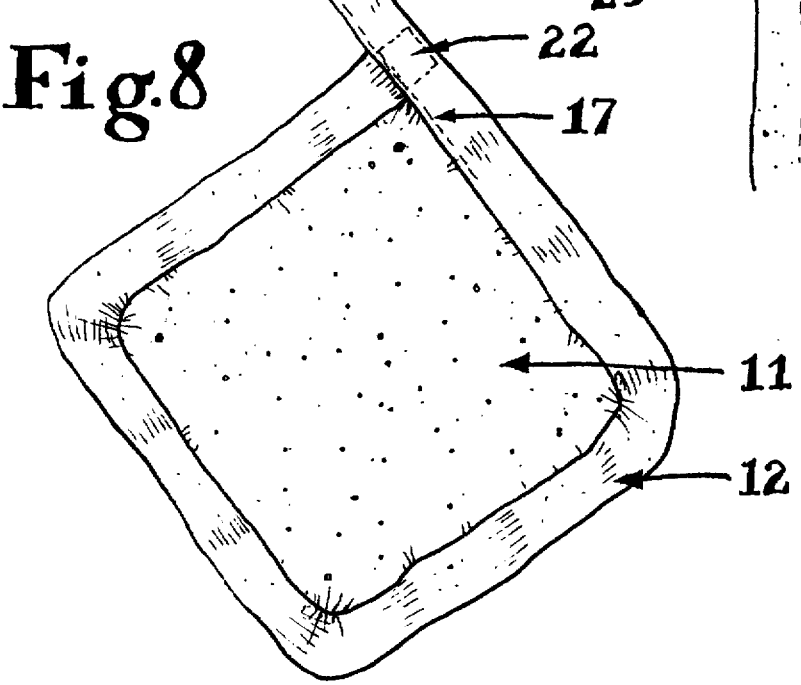

LENS WIPE

FIELD OF THE INVENTION

The present invention relates to the removal of wetness from eye wear while simultaneously applying an anti-fogging agent. This can be eye wear worn at any time, but in particular it may be used when the eye wear is worn during an activity where the eye wear may become wet or fogged up such as skiing, snowmobiling or racquetball. The invention will continue to wipe away wetness even after the invention itself has become wet. The invention need only to be wrung out and it will continue to wipe away the wetness and leave a streak free surface.

BACKGROUND OF THE INVENTION

Typical methods of wiping wetness from eye wear include tissues or cloth handkerchiefs. These two methods will only work for a short amount of time. A tissue will start to fall apart when it absorbs too much wetness. It will also leave small particles on the surface being wiped. A typical cloth handkerchief will absorb wetness for a short period of time until it reaches it's saturation point. It may then be wrung out but it will not absorb any more wetness, nor will it leave a streak free surface.

The present invention has been devised to solve these wetness and streak problems while simultaneously applying an anti-fogging agent enabling the wearer of the eye wear to see things through a clearer and streak free surface.

Being able to see one's surroundings more clearly will also enhance one's safety and enjoyment during the activity of one's choice when the eye wear is being worn.

The present invention came about when a situation arose where being able to see one's surroundings better became desirable for both safety and enjoyment of an activity.

While skiing in inclement weather, it went from snow, to freezing rain, to rain in a period of approximately two hours, it became increasingly moredifficulttosee. The tissue and cloththat were used to wipe the wetness from the eye wear became soaked and ineffective. Looking through eye wear that was still wet and streaked after wiping made the activity more dangerous and less enjoyable.

A material was found that solved these wetness and streak problems. The material was saturated in a solution of alcohol, glycol and surfactants and allowed to dry. This treatment of the material aids in the significant reduction of condensation build up due to air temperature and body temperature. Added to the material around the perimeter is a narrow border of a different material. This narrow border could be a nylon piping for example, but does not necessarily need to be made of nylon. The material for the border is not part of the wiping surface. It's purpose is to enable a loop to be made at one corner of the wiping surface so that the invention may be hung on one's apparel or equipment.

SUMMARY OF THE INVENTION

A product for the removal of wetness and streaks due to wetness, and simultaneous application of an anti-fogging agent is provided which consists of a treated piece of material cut to a usable size. The size may vary depending on the area of the surface that needs to be wiped.

The material from which the invention is made is first treated with a solution of alcohol, glycol and surfactants.

After it has dried it is then cut to a usable size. After the material is cut the circumference is measured. This measurement is then transferred to the piping material adding enough to the length of the piping material so that there is enough material for the loop to be formed.

The piping material is then attached around the perimeter of the wiping material by using a plurality of stitches of all purpose thread done through conventional sewing methods. The piping material is attached by starting at one particular point and moving around the perimeter until it is then brought past the point where it was first attached so an elongated piece of piping is now extended past the wiping material. This elongated piece of piping material will allow a loop to made.

The loop may then be formed by bringing the end of the elongated piece of piping back to the wiping material at the point where the elongated piece of piping extended past the wiping material. The loop may then be fastened by using a fastener consisting of a backing with a surface of minute nylon hooks and loops the will fasten tightly with another piece of the same substance. These two pieces of fastener are attached by using a plurality of stitches attached through conventional sewing methods One piece of fastener will be attached to the end of the elongated piece of piping, the other piece of fastener will be attached at the point where the piping extends past the wiping material This invention can be folded or crumpled up without damage to the product itself and without affecting it's usefulness.

When one is done using the product it should be left out in the air to dry. It may be hung by the loop or placed of a surface to dry. When dry, it may become a little more stiff then when it was first used. To restore to original softness place hands on opposite sides of material and rub material against itself. It may also be crumpled up into a ball and rubbed between the palms of one's hands.

DESCRIPTION OF THE DRAWINGS

FIG. 3 is a reverse view of FIG. 2, demonstrating how the invention looks from the back.

FIG. 4 is a detailed side view of the fasteners.

FIG. 5 is another detailed side view of the invention showing the fastener in the closed position.

FIG. 6 is a front view of material 11 before piping 12 (FIG. 7) is added

FIG. 7 is a view of the piping demonstrating how it is folded before being attached to the material shown in FIG. 6.

FIG. 8 gives a cross sectional view of piping 12 as it is attached to material 11 by overlapping piping 12 over end piece 22 and is held in place by stitches 17.

DETAILED DESCRIPTION OF THE DRAWINGS

Figure 1:
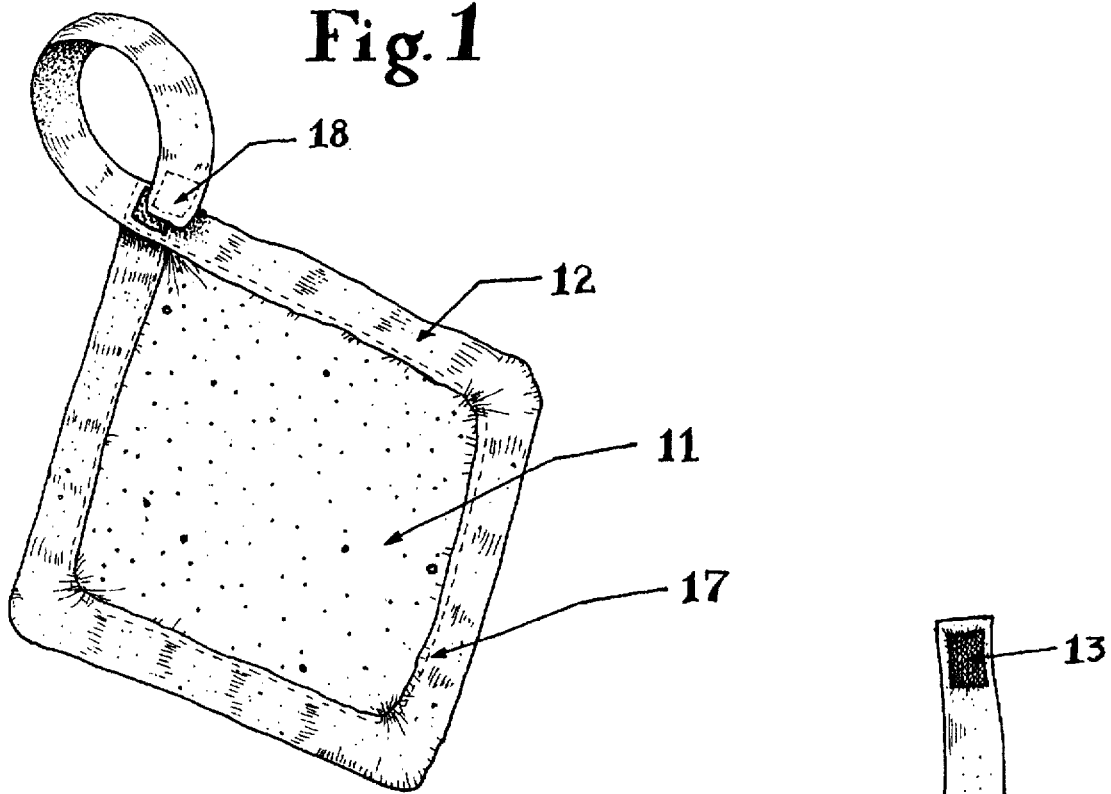
FIG. 1 shows the invention in the completed state with the fastener in the closed position.

In FIG. 1 the invention is shown in the completed state utilizing material 11 of FIG. 6 and piping 12 of FIG. 7. Number 17 of FIG. 1 denotes where the piping 12 is attached to the material 11 using a plurality of stitches. Number 18 of FIG. 1 denotes the plurality of stitches used to hold the fastening device to piping 12.

Figure 2:
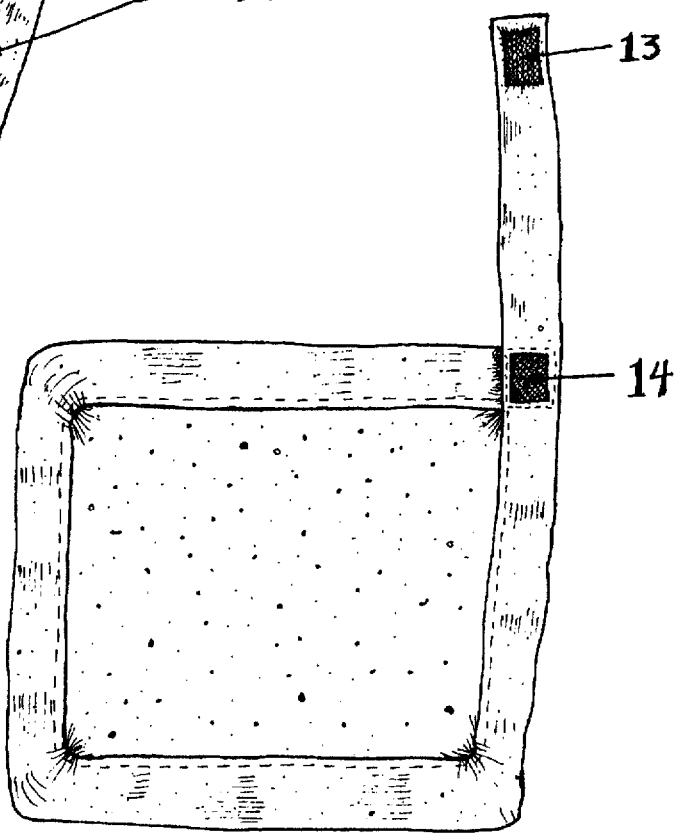
FIG. 2 shows the invention from the same view as FIG. 1, however the fastener has been opened in FIG. 2.

In FIG. 2 numbers 13 and 14 designate the hook and loop sides of the fastening device. To fasten, one must fold the elongated strip of piping 12 so that fastener 13 can be placed directly on top of fastener 14 and then a light pressure must be applied so that 13 and 14 are pressed together and will be adhered to one another by the hooks and loops that constitute the fastener.

FIG. 3 is the reverse side of FIG. 2. Numbers 18 and 19 are indicative of where the plurality of stitches are that secure fastening devices 13 and 14 to piping 12. Numbers 18 and 19 are found on the opposite side of piping 12 from numbers 13 and 14 respectively FIG. 4 illustrates a side view of the invention, specifically where the fastening devices 13 and 14 are attached to piping 12, and where the plurality of stitches 18 and 19 are found.

FIG. 5 is another detailed side view of the invention demonstrating how piping 12 is folded over so that fastening device 13 meets the cooperating fastening device 14 and is in the secured position.

FIG. 6 is a front view of the wiping material as it appears before piping 12 of FIG. 7 is added. FIG. 6 displays the wiping material as it may look once it has been cut to a usable size and shape, although not necessarily always the exact same size and shape.

FIG. 7 is an enlarged, detailed view of piping 12 as it appears before it is attached to material 11 of FIG. 6. Number 21 indicates where piping 12 is folded over at the end of the elongated strip and is sewn using a plurality of stitches as designated by number 20. By making fold 21 and securing with stitches 20, the raw edge of piping 12 will not be able to become unraveled. Piping 12 must then be folded in half (number 23) along the entire length so that piping 12 may cover both sides of the edge of material 11. Number 17 shows how the piping 12 is secured after being folded.

FIG. 8 gives a cross sectional view of the invention making it possible to see how end 22 of piping 12 is secured inside fold 23. Stitches 17 will then secure end 22 in place inside fold 23. By securing end 22 inside fold 23 with stitches 17, end 22 will not be able to become unraveled.

Figure 9:
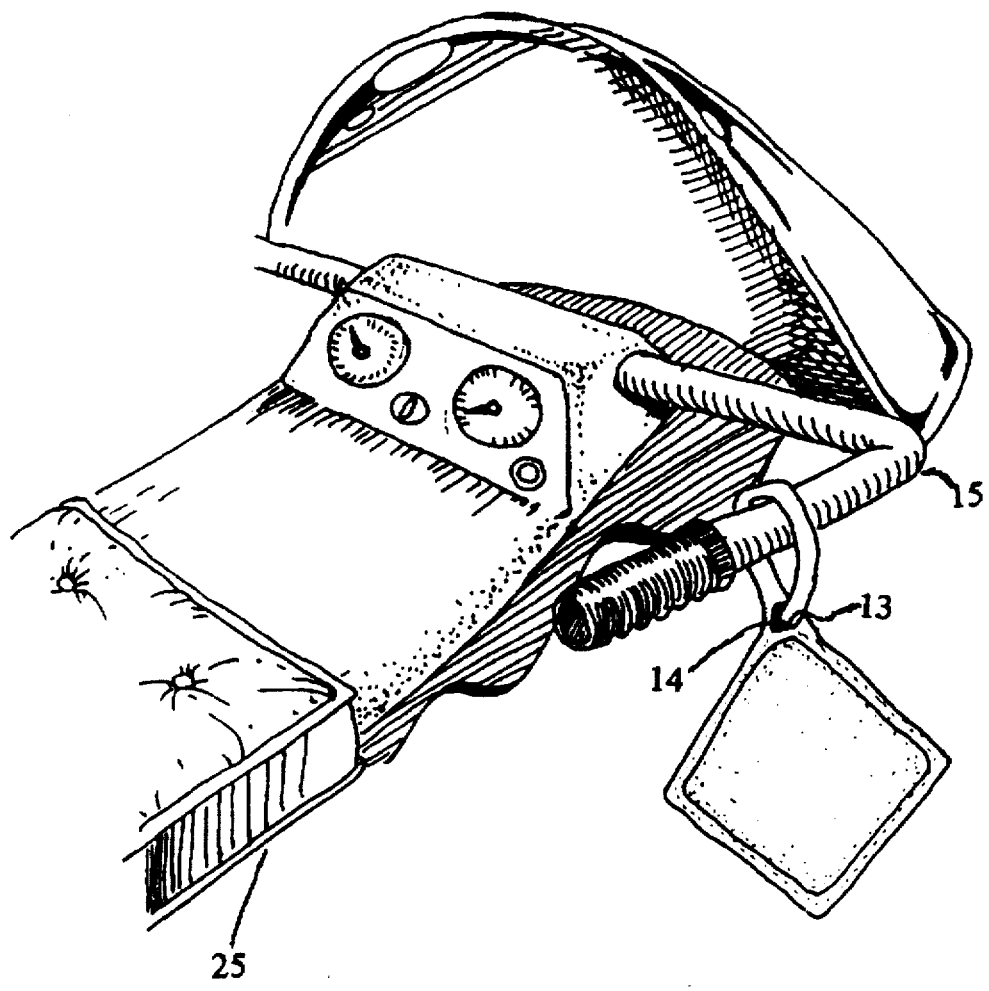
FIG. 9 shows the invention as it may be hung from the handlebars of a snowmobile.

FIG. 9 demonstrates how the invention may look after one has used a slight pulling motion to pull fasteners 13 and 14 apart thus opening the elongated end of piping 12, then placing the elongated end of piping 12 over the handlebars number 15, of snowmobile number 25, and placing fastener 13 over fastener 14 and pressing 13 and 14 together to secure the invention in place.

Figure 10:
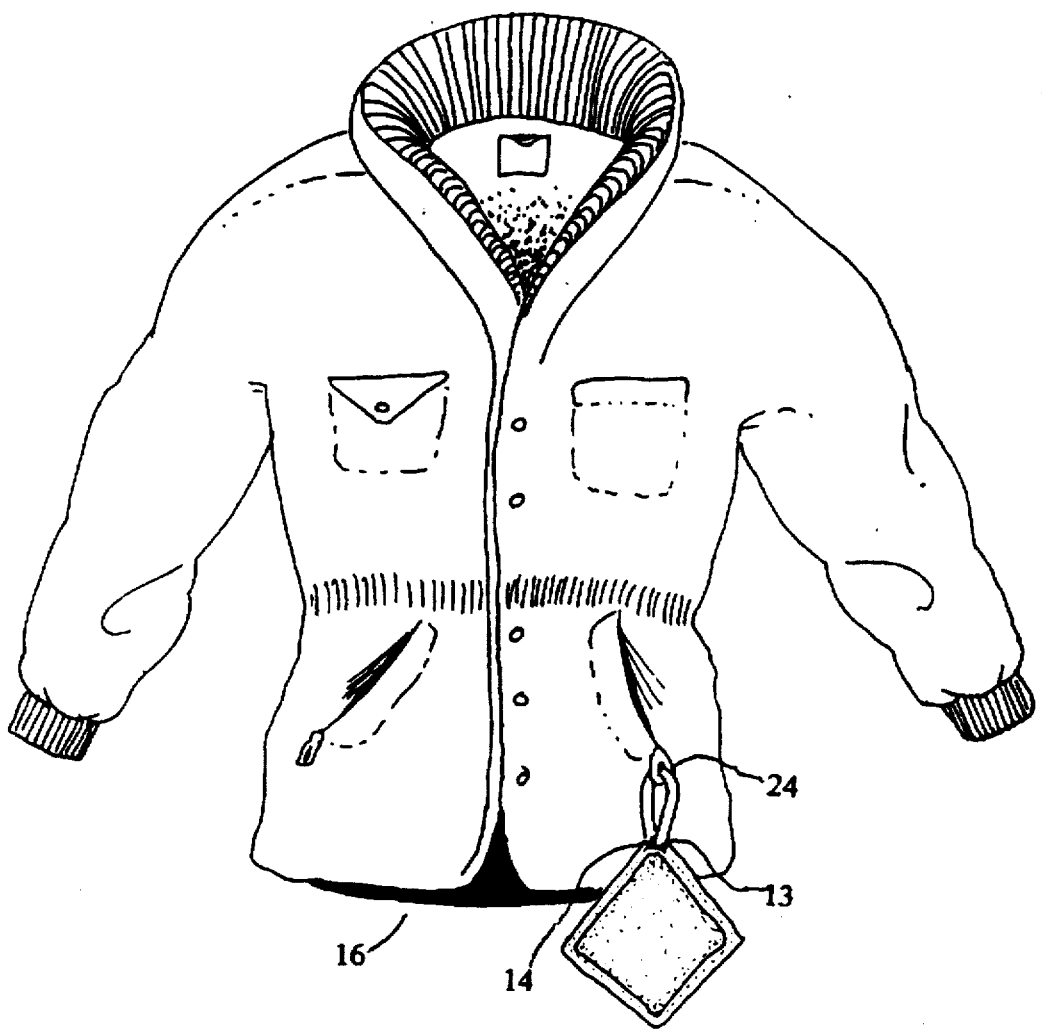
FIG. 10 demonstrates how the invention may be hung from the front of a ski jacket.

FIG. 10 shows how the invention may look when one has pulled apart fasteners 13 and 14 and then taken the elongated end of piping 12 and pulled it through loop 24 of jacket 16. Once piping 12 has been pulled through loop 24, then fastener 13 must be placed on top of fastener 14 and pressed together to secure the invention to jacket 16 via loop 24.

PHYSICAL PROPERTIES

Wiping material shall be made from sheepskin or lambskin, split before tanning. Material shall be full oil-tanned so as to produce a soft absorbent material.

| | |
|---|---|
| Median thickness In accordance with applicable portions of Method 1011 of Federal Specification KK-L-311a | 1/64 inch min. |
| Breaking strength In accordance with method 2031.1 of Federal Specification KK-L-311a, Amendment 4, Part 3. | 30 pounds min. |
| Water Absorption | 375 grams per 100 grams of conditioned material |
| Water removed by wringing In accordance with paragraph 4.3.1 of Federal Specification KK-C-300c. | 200 grams per 100 grams of cond. material |
| Time of Wetting In accordance with paragraph 4.4.3 of Federal Specification KK-C-300c. | 30 seconds max. |

I claim:

1. A lens wiping device comprising:

(a) a wiping material having a periphery extending therearound, said wiping material treated with an anti-fogging solution;

(b) a piping material having first and second ends, said piping material being secured to and extending around the entire periphery of the wiping material, the first end of the piping material being secured to a corner of the wiping material and the second end of the piping material extending beyond the wiping material and overlapping the first end thereof; and (c) a first releasable fastener means secured to the second end of the piping material and a cooperating second releasable fastener means secured to the piping material adjacent the first end thereof, whereby the piping material may be formed into a loop which facilitates attachment of the device to a support.

\* \* \* \* \*